E. COLLETT.
PROCESS OF MANUFACTURING SULFATE OF AMMONIA.
APPLICATION FILED JUNE 13, 1912.
1,052,797.
Patented Feb. 11, 1913.
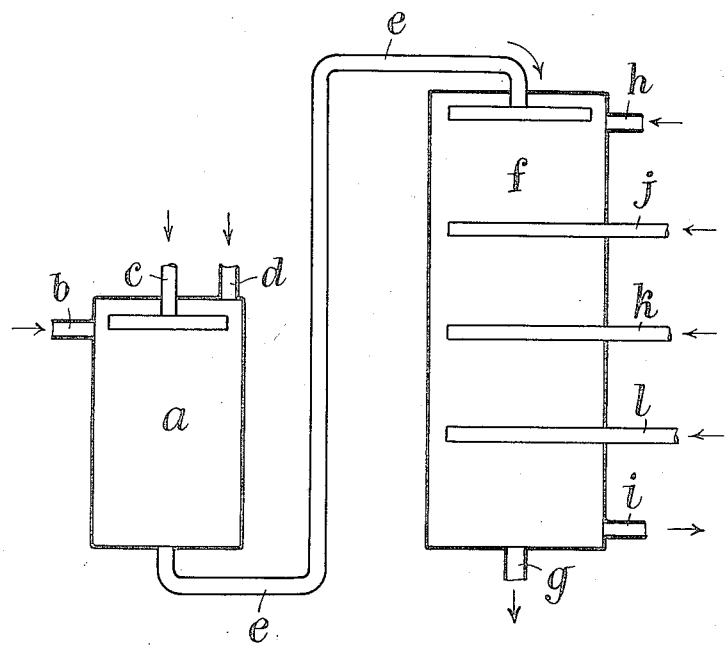

UNITED STATES PATENT OFFICE.

EMIL COLLETT, OF CHRISTIANIA, NORWAY.

PROCESS OF MANUFACTURING SULFATE OF AMMONIA.

1,052,797.     Specification of Letters Patent.    Patented Feb. 11, 1913.

Application filed June 13, 1912. Serial No. 703,440.

*To all whom it may concern:*

Be it known that I, EMIL COLLETT, a subject of the King of Norway, residing at Christiania, Norway, have invented certain new and useful Improvements in Processes of Manufacturing Sulfate of Ammonia; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object a process of manufacturing sulfuric acid salts by neutralizing and oxidizing sulfurous acid.

It is known to produce sulfates or mixtures of sulfates and sulfites by reacting with sulfur dioxid and oxygen upon ammonia in the presence of water and subsequent oxidation by continued treatment with oxygen or oxygen containing gases. In carrying out this process on a commercial scale it has not been possible however to obtain a complete oxidation of the sulfite formed into sulfate, this being for a great part due to the liability of the sulfite to give off either ammonia or sulfur dioxid. Thus if a current of an inert gas is blown through a solution of, for instance, the normal sulfite of ammonia, having the formula $(NH_4)_2SO_3$ and being of a decidedly alkaline reaction, it will be found that considerable amounts of ammonia escape. If on the other hand the acid sulfite of ammonia $(NH_4HSO_3)$ is subjected to a similar treatment this salt will give off sulfur dioxid. Owing to these facts it is difficult to transform said salts into sulfate by treatment with air, when losses of ammonia or sulfur should be obviated. I have now found however that besides the above mentioned combinations of ammonia and sulfur dioxid another combination exists, which on being treated with a current of an inert gas, does not give off neither ammonia nor sulfur dioxid. This compound which in the following is called "neutramsulfite" has an absolutely neutral reaction and its aqueous solutions are able to be heated and concentrated in an atmosphere of an inert gas without being decomposed. The combination contains ammonia and sulfur dioxid in the proportion of 1:2.73. Its constitution is very complicated but could be approximately expressed by the formula $(NH_4)_3H(SO_3)_2$.

According to the present invention the properties of this neutramsulfite are made use of in that at first a solution of this compound is produced by reacting upon sulfur dioxid with ammonia, water and oxygen, whereupon this solution is subjected to an oxidizing treatment by means of air or other oxidizing matters while at the same time ammonia is continuously introduced in regulated quantities just sufficient to neutralize the sulfurous acid liberated by the oxidation process. The complete reaction between the neutramsulfite the oxygen and the ammonia could be illustrated by the following formula:

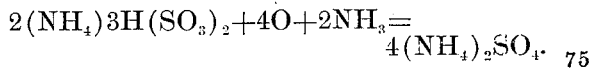

$$2(NH_4)3H(SO_3)_2 + 4O + 2NH_3 = 4(NH_4)_2SO_4.$$

The oxidation is preferably carried out in towers through which the neutramsulfite solution is passed in the same direction as the oxidizing gas and the ammonia.

The accompanying drawing shows diagrammatically one form of apparatus which may be used for the carrying out of the process and consists of two towers or chambers *a* and *f*, the sulfur dioxid and oxygen entering the tower *a* at *b*, water or water vapor being introduced at *c*, and the gases and vapor come into contact with the ammonia which is introduced at *d*. The amount of ammonia introduced is so regulated in relation to the amount of sulfurous acid, that the above defined neutramsulfite is formed. As the solution of this neutramsulfite is of neutral reaction it is an easy task to control the process accordingly.

Instead of one single tower *a* there may of course be arranged a plurality of towers in series. As shown in the drawing the ammonia sulfur dioxid, air, and water all pass through the tower *a* in the same direction and not as usually in similar processes in opposite direction. The neutramsulfite solution obtained in this manner is introduced into the other chamber or tower *f* (of which also a greater number may be arranged in series) where in passing from the top to the bottom it encounters at several points the ammonia, which is introduced at *j*, *k* and *l*. For supplying the necessary oxygen, preferably, hot air is introduced at *h*, near the top of the tower and flows downward in the same direction as the descending solution and any surplus gases pass off through $i$, the resultant ammonium sulfate formed being drawn off from the tower at $g$.

It is of very great importance that as above described the reaction components all pass through the chambers in the same direction or parallel to one another because if the current of gas is passed through the chamber in a direction opposite to that of the liquid, losses of ammonia are liable to take place as well in the reaction chamber $a$ as in the oxidation chamber $f$. Thus if in this latter chamber the oxidizing gas is conducted through the tower in opposite direction to the sulfite solution the ammonia introduced will be carried off without combining as desired with the sulfur dioxid liberated by the oxidation of the neutramsulfite and this again would make it necessary to arrange special absorption apparatus for treating the escaping ammonia containing gases.

I claim,

1. The process of manufacturing sulfate of ammonia, which consists in passing sulfur dioxid, ammonia, water and an oxidizing gas in the same direction relatively to one another through a chamber, and subsequently treating the solution thus obtained with an oxidizing gas.

2. The process of manufacturing sulfate of ammonia, which consists in producing a neutral sulfite solution by passing sulfur dioxid, ammonia, water and an oxidizing gas in the same direction through a series of chambers, and subsequently treating the neutral solution thus obtained with an oxidizing gas.

3. The process of manufacturing sulfate of ammonia, which consists in passing sulfur dioxid, ammonia, water and an oxidizing gas in the same direction through a chamber and reacting with an oxidizing gas in another chamber upon the sulfite solution obtained, said oxidizing gas being passed through the chamber in the same direction as the sulfite solution.

4. The process of manufacturing sulfate of ammonia, which consists in producing a neutral sulfite solution by passing sulfur dioxid, ammonia, water and an oxidizing gas in the same direction relatively to one another through a chamber, and subsequently treating the neutral sulfite solution thus obtained with an oxidizing gas and ammonia, the latter combining with the sulfurous acid liberated by the oxygen when combining with the neutral sulfite.

In testimony that I claim the foregoing as my invention, I have signed my name in presence of two subscribing witnesses.

EMIL COLLETT.

Witnesses:
  H. E. GUBBERHESEN,
  N. SCHRAUDE.